United States Patent [19]
Pellett et al.

[11] 3,819,350
[45] June 25, 1974

[54] METHOD FOR RAPIDLY MELTING AND REFINING GLASS

[75] Inventors: Fred G. Pellett, Maumee; Raymond S. Richards, Toledo; Robert R. Rough, Toledo; Douglas F. St. John, Toledo; Paul R. Wengert, Toledo, all of Ohio

[73] Assignee: Owens-Illinois, Inc., Toledo, Ohio

[22] Filed: Sept. 28, 1972

[21] Appl. No.: 292,991

[52] U.S. Cl. .................... 65/134, 65/135, 65/178
[51] Int. Cl. ...................... C03b 5/00, C03b 5/16
[58] Field of Search ............ 65/134, 178, 135; 13/6; 55/199

[56] References Cited
UNITED STATES PATENTS

| | | | |
|---|---|---|---|
| 1,956,171 | 4/1934 | Hither | 13/6 |
| 2,006,947 | 7/1935 | Ferguson | 65/178 |
| 2,007,755 | 7/1935 | Ferguson | 65/178 |
| 2,762,167 | 9/1956 | De Voe | 65/134 |
| 3,244,493 | 4/1968 | Cala | 65/134 |
| 3,364,042 | 1/1968 | Swain et al. | 65/134 |

*Primary Examiner*—S. Leon Bashore
*Assistant Examiner*—Kenneth M. Schor
*Attorney, Agent, or Firm*—E. F. Dwyer; E. J. Holler

[57] ABSTRACT

In accordance with the method of this invention, glass-forming materials are subjected to heat and agitation sufficient to form a molten glass having some undissolved glass-forming materials, cords, and incompleted chemical reactions between the glass-forming materials and containing a high number of gaseous inclusions. This molten glass is subjected to a shearing action to complete the melting of any unmelted sand grains remaining from the glass-forming materials, and to complete the chemical reactions that may have been incomplete, and to remove any cords remaining but leave the glass with gaseous inclusions; this glass is thereafter subjected to centrifugal forces sufficient to remove the gaseous inclusions and thereby produce a refined molten glass having the desired homogeneity. In one embodiment of the invention, glass-forming materials are introduced into a first chamber wherein they are subjected to heat and agitation sufficient to form a molten glass having some undissolved glass-forming materials, cords, and incompleted chemical reactions between the glass-forming materials and containing a high number of gaseous inclusions. This glass is introduced into a second chamber, where it is subjected to a shearing action to remove remaining inhomogeneities and complete the melting of the glass; this molten, homogenized glass containing gaseous inclusions is introduced to a third chamber where it is subjected to centrifugal forces sufficient to remove the gaseous inclusions, producing a refined, homogeneous molten glass, which is discharged from the third chamber.

9 Claims, 8 Drawing Figures

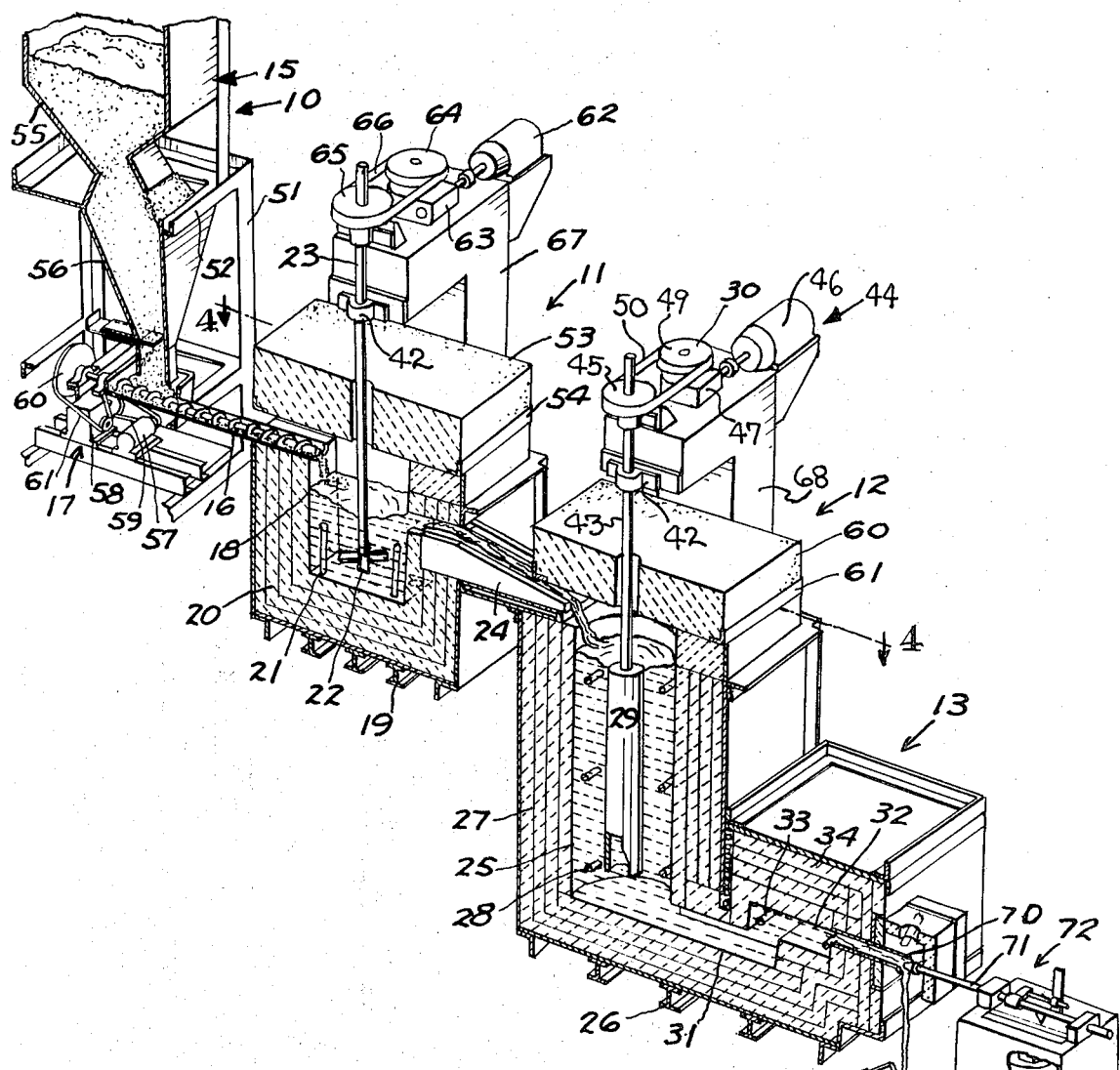
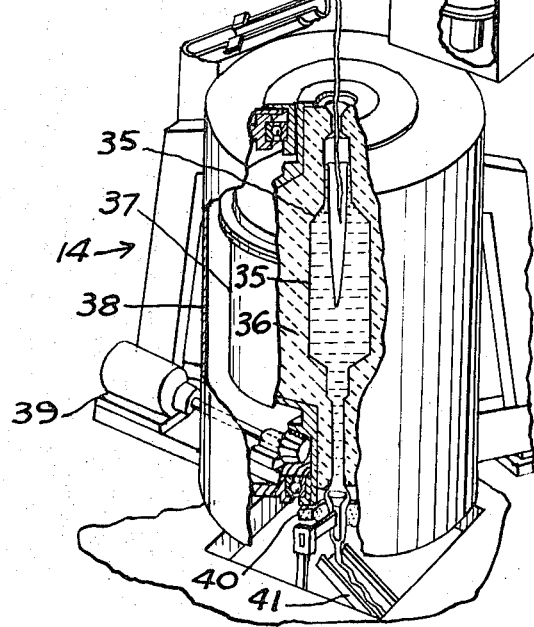
FIG. 2

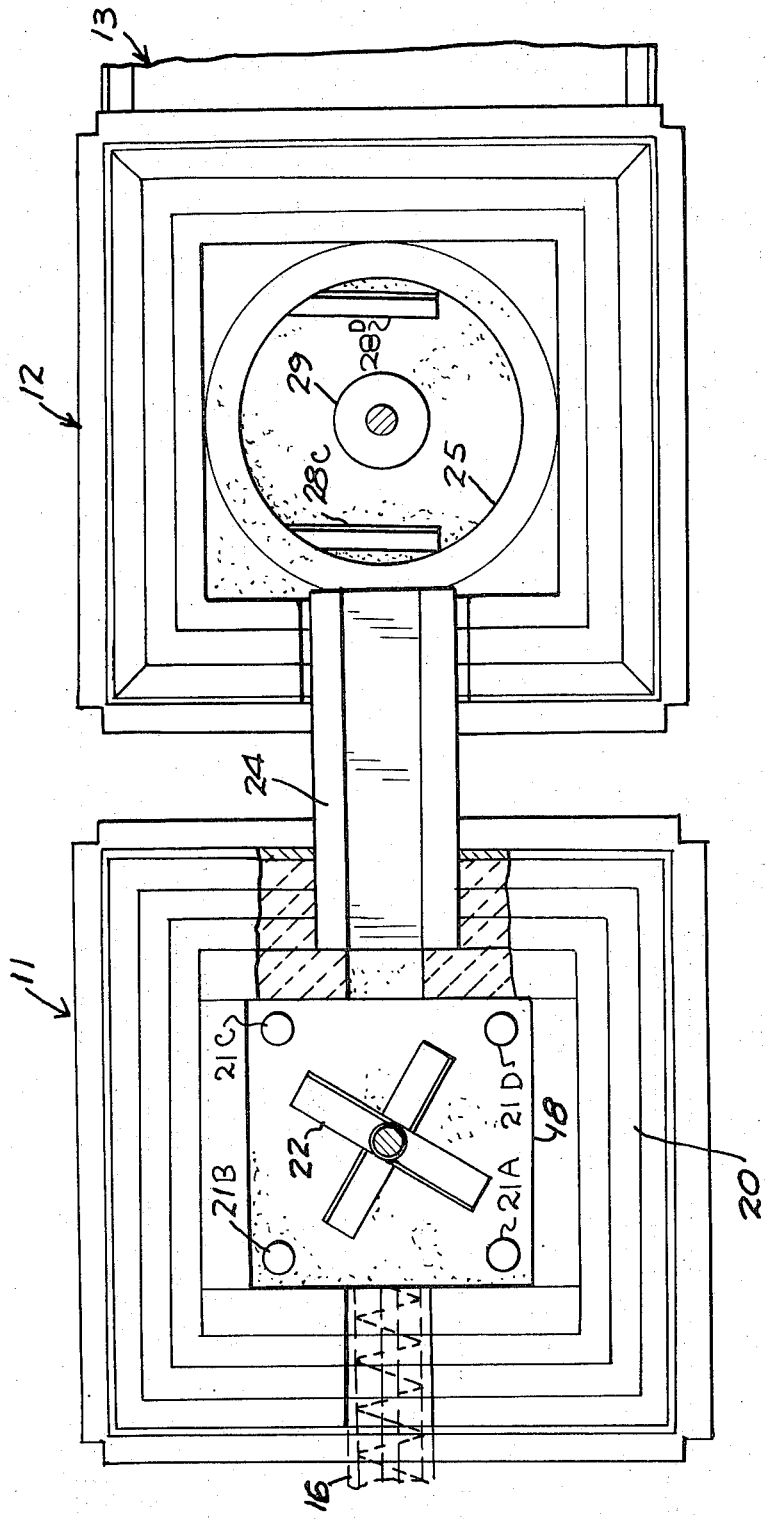

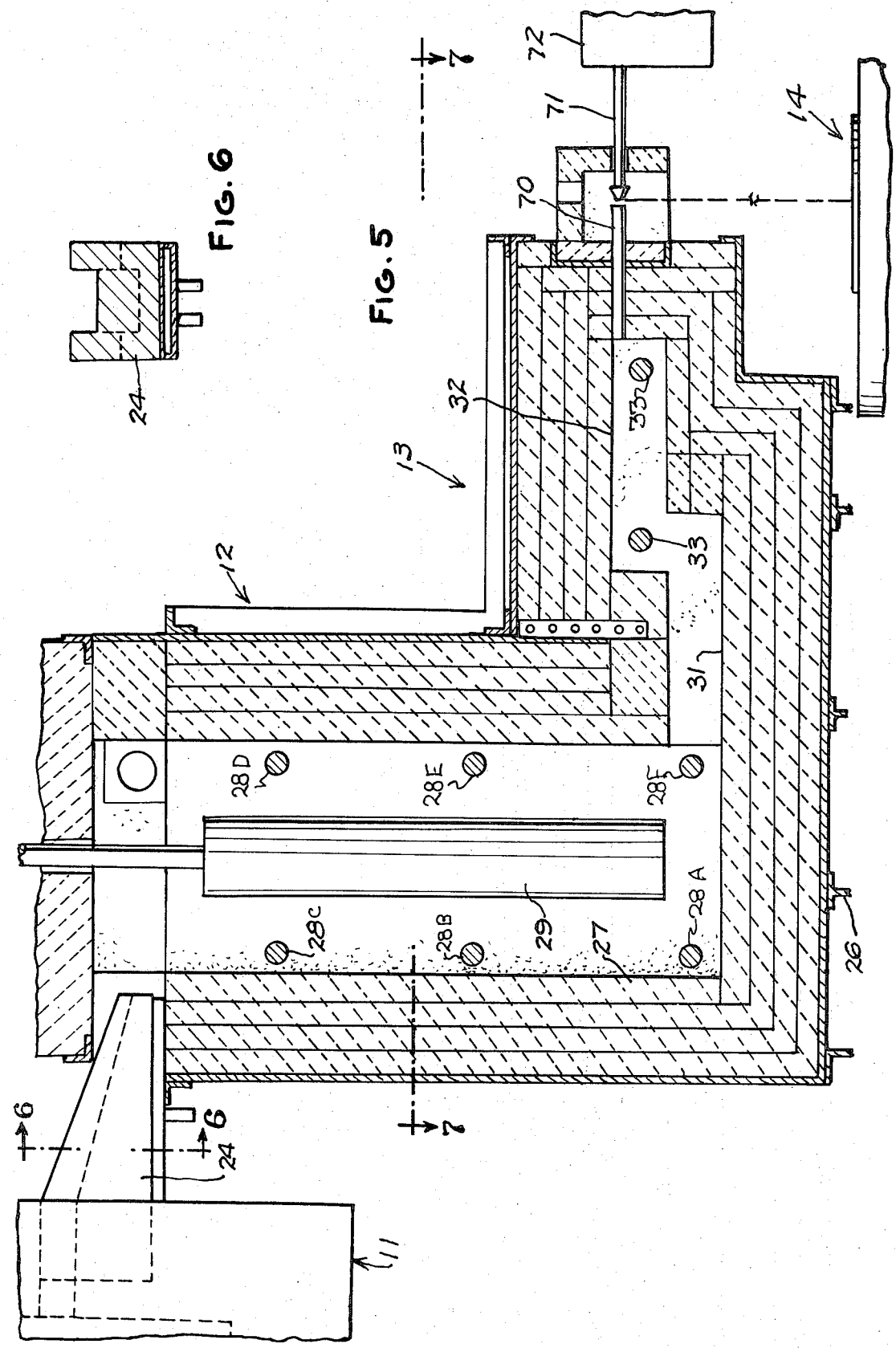

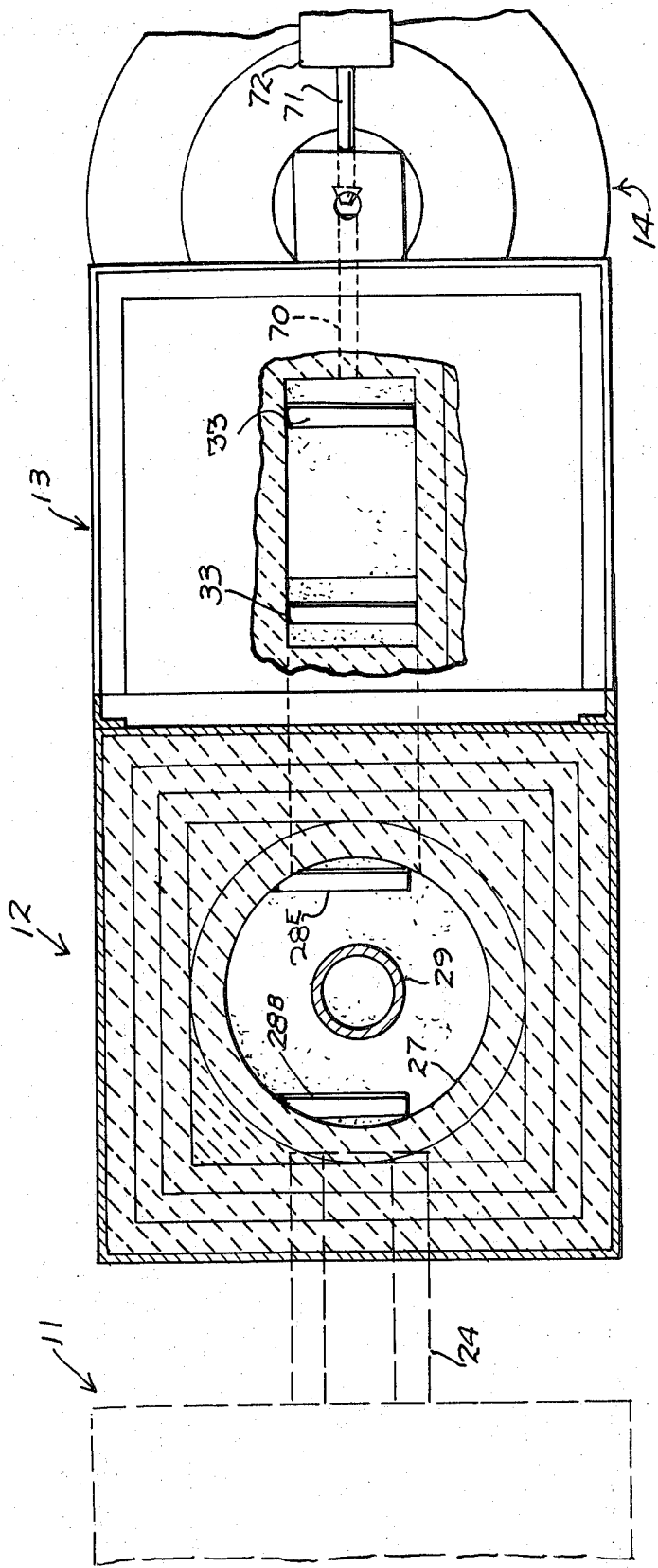

METHOD FOR RAPIDLY MELTING AND REFINING GLASS

BACKGROUND OF THE INVENTION

1. Field of the Invention

This invention relates to a method and apparatus for improving the glass-making process.

2. Description of the Prior Art

Glass is now made in commercial quantities, by introducing glass-forming materials into an apparatus known as a furnace or tank which is likely to hold about 300 tons of molten glass, quantities of heat are added to the glass to bring the glass-forming materials to a molten state; additional batch material is fed onto the surface of already molten glass within the furnace, where it floats on the top of the molten glass; and the batch material is gradually melted into the molten mass of glass in the furnace. Physical action and chemical reactions during the heating of the molten mass of glass in the furnace lead to the generation of "gaseous inclusions". These gaseous inclusions are then removed from the molten glass mass by continued heating of the mass in the furnace for periods ranging from 24 to 36 hours. The rate of processing of glass in a prior art furnace is very slow, due to the time required to remove the gaseous inclusions formed during the melting process. Accordingly, among the objects of the invention are to provide a process and apparatus wherein the melting, mixing and homogenizing of the batch material are optimized, and within a very short process residence time in a small volumetric area, and without restriction as to the formation of undesirable gaseous inclusions; the gaseous inclusions are removed in a subsequent rapid refining process, utilizing centrifugal action.

A further object of the invention is to provide a method and apparatus for melting and refining glass wherein large quantities of glass may be prepared by continuously melting, so as to produce a homogenized glass; and rapidly refining to produce a glass with an acceptable number of gaseous inclusions; this obviates the need for large, volumetric melting tanks and/or furnaces, and produces a glass wherein the homogeneity of the glass is controlled and maximized in terms of the desired end uses.

SUMMARY OF THE INVENTION

Glass-forming materials are subjected simultaneously to heat and agitation sufficient to form a molten glass having some undissolved glass-forming materials, cords, and incompleted chemical reactions between the glass-forming materials and containing a high number of gaseous inclusions; this molten glass is subjected to a shear action to complete the melting of unmelted sand grains and to complete the chemical reactions that may be incomplete, and to remove any cords remaining in the molten glass but having gaseous inclusions therein; the resultant homogeneous glass containing gaseous inclusions is subjected to centrifugal forces sufficient to remove the gaseous inclusions to produce a refined, homogeneous molten glass.

DESCRIPTION OF THE DRAWINGS

FIG. 2 is a sectional perspective view of an apparatus embodying the invention;

FIG. 4 is a fragmentary sectional view taken along the line 4—4 in FIG. 2;

FIG. 5 is a fragmentary vertical sectional view of another portion of the apparatus shown in FIG. 1;

FIG. 6 is a fragmentary sectional view taken along the line 6—6 in FIG. 5;

FIG. 7 is a fragmentary sectional view taken along the line 7—7 in FIG. 5;

DESCRIPTION OF THE PREFERRED EMBODIMENTS

Figure 1:
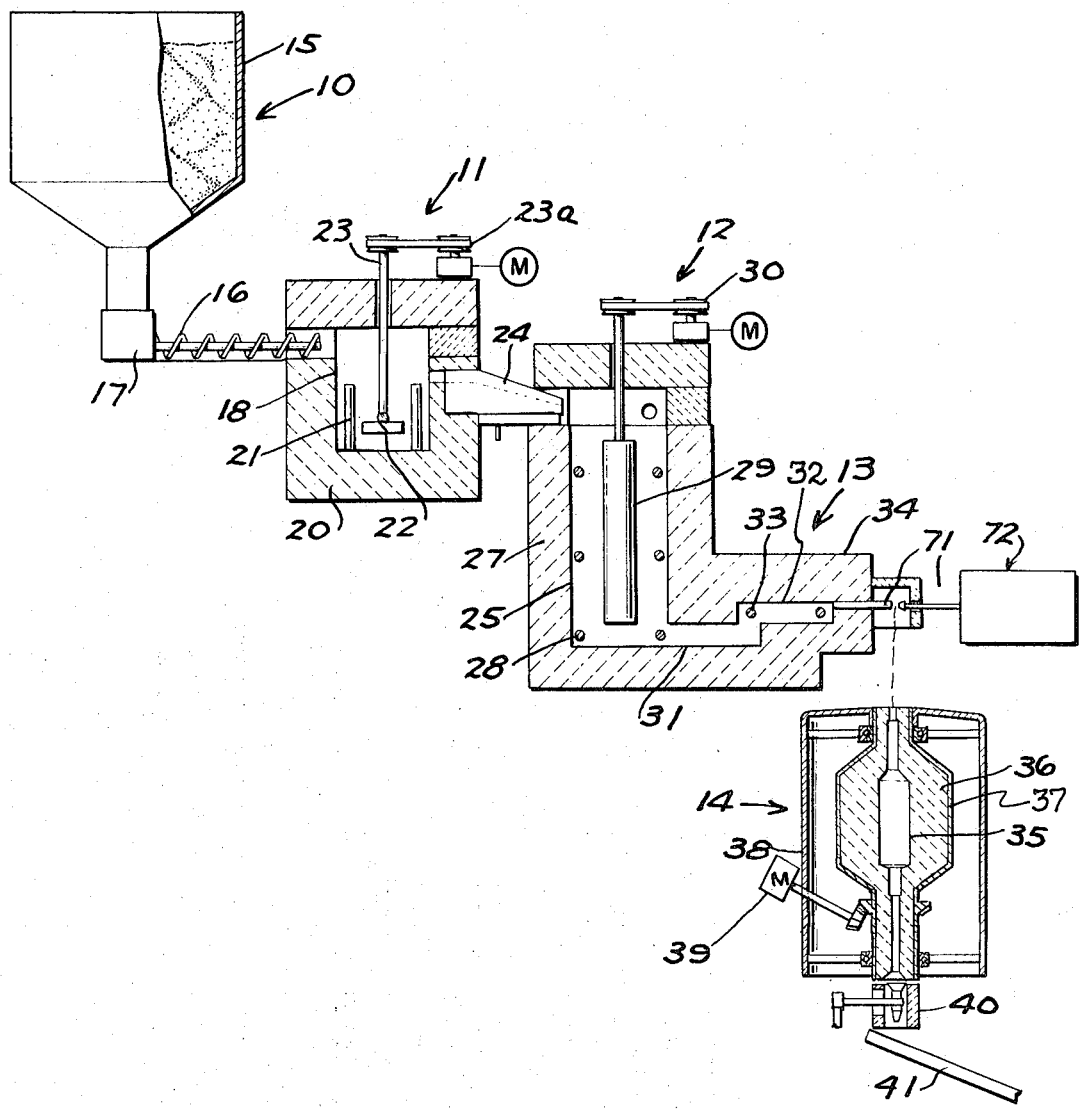
FIG. 1 is a schematic cross-sectional view of the apparatus embodying the invention.

Referring to FIGS. 1 and 2, an apparatus embodying the invention for performing the method of the invention is shown schematically in FIG. 1 and in sectional perspective in FIG. 2. The apparatus comprises a batch delivery assembly 10 which delivers glass-forming materials to a first mix-melter 11. The batch materials are simultaneously heated and agitated to form a molten mass of glass having undissolved sand grains, cord forming - undissolved batch material and incompleted chemical reactions between the glass forming materials and containing gaseous inclusions. The molten, cord-containing glass is delivered to a second mix-melter 12 in which molten glass is subjected to a shearing action which completes the solution of sand grains in the molten glass, completes the chemical reactions, and removes cords. The molten glass from mix-melter 12 may be delivered to a temperature conditioning unit 13 wherein the temperature of the glass is controlled and delivered to refining apparatus 14 wherein the gasous inclusions are removed. The refined molten glass is withdrawn from the lower end of the refining apparatus 14.

The batch delivery apparatus 10 comprises a hopper 15 for containing the glass-forming materials and delivering the materials to a screw 16. The screw 16 is rotated through a drive mechanism 17 so that it delivers glass-forming materials to the chamber 18 of a first mix-melter 11. The mix-melter 11 comprises a steel framework 19 and refractory liners 20 that define the chamber 18. Heat is applied to the glass-making materials in the chamber utilizing the Joule effect, and the molten glass and glass-forming materials in the chamber 18 are agitated vigorously by impeller 22 mounted on shaft 23 which is rotated by a drive mechanism 23A. The degree of heat and agitation applied to the glass-forming materials is sufficient to produce a molten glass. This molten glass having some undissolved glass-forming materials, cords, and incompleted chemical reactions between the glass-forming materials and containing a high number of gaseous inclusions is delivered to second mix-melter 12, over trough 24, shown in FIGS. 2, 5 and 6.

The glass exiting from the chamber 18 is substantially molten, has cords and undissolved sand grains; and chemical reactions incompleted and contains gaseous inclusions.

The glass from chamber 18 is delivered to chamber 25 of second mix-melter 12. The second mix-melter 12 includes a steel framework 26, refractory liner 27 defining the chamber 25. Electrodes 28A, B, C, D, E and F (FIG. 5) are provided in the chamber to add heat to the molten glass when desired. Cylinder 29 is positioned in the chamber 28 and is rotated by drive mechanism 30. The rotation of the cylinder subjects the glass passing through the chamber 25 to a shearing action during its residence time. The glass is removed through an opening 31 in the lower end of the chamber 25 and still contains gaseous inclusions. This foamy molten glass removed from chamber 25 differs from the glass removed from the chamber 18 in that it is entirely melted, and the glass phase is homogeneous and has gaseous inclusions substantially uniformly distributed throughout. This foamy glass has all chemical reactions substantially completed, and the glass phase is substantially homogeneous.

In one embodiment, the molten glass then passes through a channel 32 of the temperature conditioning unit 13, which includes electrodes 33 for heating, and is delivered downwardly in a stream to the open upper end of a rotatable chamber 35 of the refining unit 14. The chamber 35 is defined by refractory liner 36 in a rotatable shell 37, surrounded by housing 38. The shell is rotated by a drive motor 39 and associated mechanisms. In the chamber 35, the glass is subjected to sufficient centrifugal force to form a void and to cause gaseous inclusions to be removed from the molten glass. The refined homogeneous molten glass, having the desired control of gaseous inclusions, is discharged from the bottom opening 40 of the chamber 35 and delivered for intended usage at discharge 41.

Batch Delivery Apparatus

Referring to FIG. 2, batch delivery apparatus 10 comprises a steel framework, including a plurality of vertical members 51 and horizontal members 52. The framework is mounted on rollers (not shown), which rest on a track (not shown), over which the apparatus 10 can be moved into and out of delivery position. Hopper 15 comprises two sections - bin 55 and chute 56. Screw 16 is positioned beneath the chute 56 and is mounted for rotation about its horizontal axis. Drive mechanism 17 comprises an electric motor 57, which drives gear reduction box 58 through a belt 59 which, in turn, drives a pulley 60 on the end of screw 16 by a belt 61.

First Mix-Melter

Figure 3:
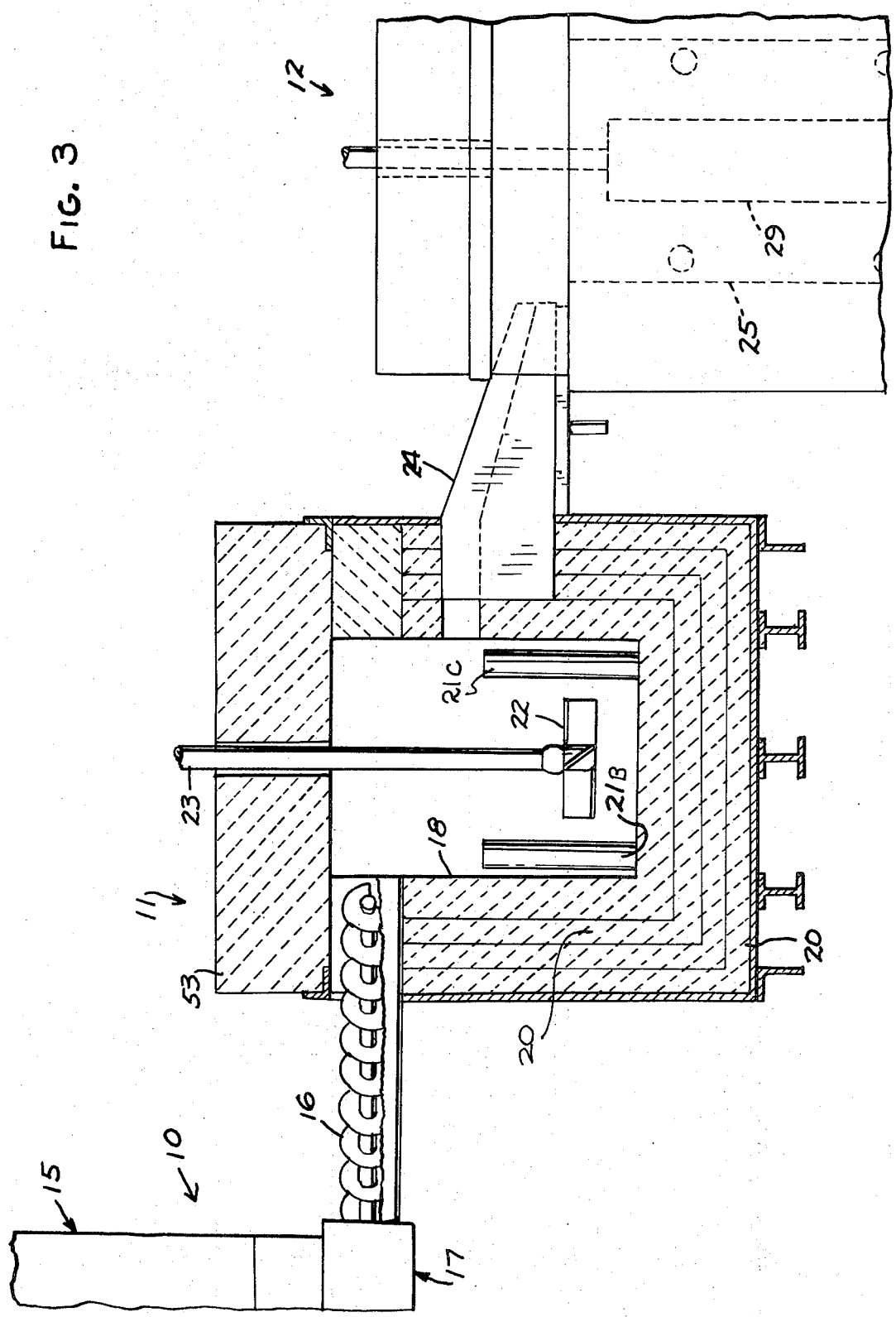
FIG. 3 is a fragmentary vertical sectional view of a portion of the apparatus shown in FIG. 1.

As shown in FIGS. 2, 3 and 4, first mix-melter 11 comprises chamber 18, which is formed by temperature-resistant refractory liner 20, made of a plurality of layers of refractory material. The refractory layers may comprise refractory brick set with a refractory cement, or a plurality of pre-cast slabs, or refractory materials which are fitted together with a refractory cement. The top of the chamber 18 is enclosed by a crown 53 with an opening therein. The crown is further reinforced by a frame 54 which permits the removal of the crown for repair and relining purposes. The opening is sufficiently large to permit the entry of the drive shaft 23. Impeller 22 is mounted on hollow shaft 23 and positioned centrally within chamber 18. The impeller 22 is made of molybdenum. Shaft 23 is hollow to permit the circulation of cooling water. The water is supplied by a rotary union (not shown). A graphite bearing 42 is used to position the shaft 23 and mount the shaft on support 67.

Drive mechanism 23A, for rotating the shaft 23, comprises an electric motor 62, driving a gear box 63, which rotates shaft 23 through pulleys 64, 65 and a belt 66. Drive mechanism 23A is mounted on a frame 67 and is independent of the crown 53.

Second Mix-Melter

Referring to the drawings, FIGS. 2, 4, 5 and 7, second mix-melter 12 comprises chamber 25, similar in construction to that of first mix melter 11; however, it is greater in depth. Cylinder 29 is mounted on shaft 43 and comprises a hollow, cylindrical shell made of a heat-resistant material, such as molybdenum or a ceramic material; the shaft is internally water cooled. Drive mechanism 44 for rotating shaft 43 comprises electric motor 46, driving gear box 47, which rotates shaft 43 through pulleys 48, 49 and belt 50. The drive mechanism is mounted on frame 68 and is independent of the crown 60. Molten glass is transported from the first mix-melter 11 across trough 24. The discharge is at a slightly lower level than the exit of the batch supply screw 16, and near the top of chamber 18 of second mix-melter 12.

Temperature Conditioning Unit

Figure 8:
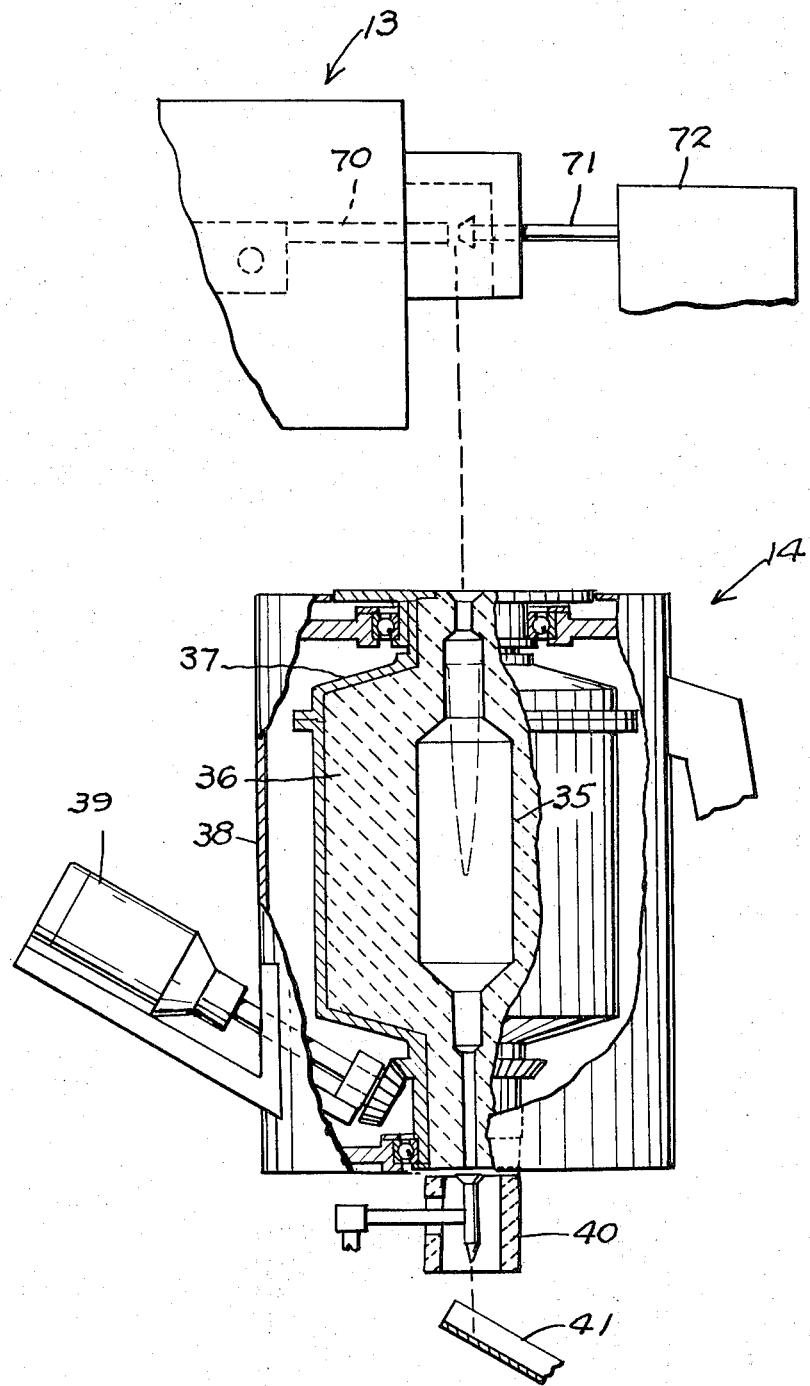
FIG. 8 is a fragmentary vertical sectional view of another portion of the apparatus shown in FIG. 1.

Referring to FIGS. 4, 5 and 8, a temperature conditioning unit 13, in one embodiment, is positioned to receive the glass flow from the second mix-melter 12. The temperature conditioning unit 13 comprises a container having a rectangular channel 32, which is formed by refractory liner 34 and supported by a framework. The channel is fed from the bottom through bottom opening or throat 31, from the second mix-melter 12. Supplementary heat may be supplied from electrodes 33 to maintain temperature. A horizontal tube 70 is positioned at the end of the temperature conditioning chamber 32 so that molten glass may leave the chamber 32 adjacent its upper end. A horizontally movable plunger 71, controlled by an air cylinder 72, regulates the flow of molten glass out of chamber 32. The plunger is air-cooled to chill glass about its periphery, forming a leak-tight seal when in the closed position.

Refining Unit

Refining unit 14 comprises a refractory chamber 35, liner 36 and shell 37 within housing 38. The chamber 37 and shell are rotatable within the housing; drive mechanism 39 rotates the chamber through a drive train, which is shown in partial cross-section in FIG. 8. The method of operation of the one embodiment of the refining unit 14 and the details of the construction, are more fully disclosed in copending U.S. patent application, Richards et al, Ser. No. 180,672, now Pat. No. 3,754,886 filed Apr. 2, 1971, entitled "Method and Apparatus for Refining Molten Glass", having a common assignee with the present application.

Heating System

Mix-melters 11 and 12 are supplied with a plurality of gas burners, not shown, because glass-forming materials do not become electrically conductive until their temperature is raised to the molten point; thus, gas burners are used to begin the melting of the glass-forming batch materials.

After start-up, the Joule effect is used to melt the incoming batch materials and to heat the molten glass in the chamber of the first mix-melter. The shaft 23 of mix-melter 11 is electrically insulated from the framework of the apparatus. Electric current may be passed through the molten glass from impeller 22 to the electrodes 21A, B, C and D. In other embodiments, the electric current may be transmitted through the molten glass between pairs of electrodes.

The second mix-melter 12 has a plurality of electrodes 28A, B, C, D, E and F, positioned in a spaced relationship about the chamber 25. The shaft 43 is electrically insulated from the framework 68. The electric current passes between pairs of electrodes and, in some embodiments, a portion of the cylinder forms a current path between pairs of electrodes. The Joule heating effect is supplemented by the application from gas burners (not shown) to the crown and other portions of the chambers to reduce heat loss through radiation from the chambers.

Process

The glass in the several stages in the process may be described as follows:
Stage 1 - a mixture of glass-forming materials and molten glass in chamber 18 of mix-melter 11;
Stage 2 - molten glass, having a high number of gaseous inclusions, undissolved sand grains, incompleted chemical reactions, and cords, exiting mix-melter 11;
Stage 3 - homogenized molten glass exiting mix-melter 12 having the glass-forming materials substantially dissolved, having undesirable cords removed, having chemical reactions substantially completed, and containing gaseous inclusions.
Stage 4 - refined homogeneous molten glass exiting refining unit 14 wherein the gaseous inclusions have been removed leaving a controlled number of gaseous inclusions in the glass.

First Mix-Melter Processing

After start-up, electric energy is used for raw material melting and continued heating of the molten glass.

Mixing and melting in chamber 11 is accomplished by the simultaneous agitation and heating of a mixture of glass-forming materials within the chamber, so that the molten glass is being mixed and the glass-making materials are being continuously melted. The glass is designated Stage 1 glass, in chamber 18, and comprises raw glass-making materials in various stages of physical and chemical reaction, with gases being evolved and gases being entrapped. Impeller 22 subjects both the molten glass and glass-making materials in the chamber 18 to agitation; as additional glass-making materials are deposited onto the surface of the existing molten glass pool, they are quickly enfolded into the molten pool, and this additional raw material is also thoroughly agitated. Impeller 22 produces a rapid and uniform dispersion of the added glass-making materials and molten glass; the simultaneous passage of an electric current through the molten glass between the impeller 22 and electrodes 21, produces a Joule heating effect and generates heat within the molten material. The simultaneous agitation with its high rate of shear and the rapid transfer of transfer of heat to small, discrete volumes of both molten glass and unmelted glass-making materials, effectively facilitates melting the glass and promotes rapid chemical reactions. Glass leaving the first mix-melter 11 is a molten glass including a high number of gaseous inclusions, some undissolved sand grains, incompleted chemical reactions, and cords, resulting from inhomogeneity of the molten glass.

Stage 2 glass exits near the top of the first mix-melter 11, but at a level somewhat lower than the entry port for the raw glass-making material.

Second Mix-Melter Processing

The molten glass, exiting from the mix-melter 11 and entering the mix-melter 12, is designated Stage 2 glass.

Cylinder 29 rotating in the chamber subjects the glass to a shearing action for the time of the glass residence in the chamber.

The molten glass path, within the mix-melter 12, is a downward, laminar flow, combined with a spiral shearing flow induced by cylinder 29, thereby insuring that all sand grains are melted, cords are removed, and chemical reactions are completed.

Glass exiting from the second mix-melter is designated Stage 3 glass, wherein all undissolved sand grains are melted, chemical reactions are completed, and cords are removed, and all glass-making material has been converted to a molten glass which is homogeneous.

Refining Process

Stage 3 glass is introduced into the rotating chamber 35 of the refiner unit, and the glass is subjected to centrifugal force, to cause gaseous inclusions to be removed from the glass. Refined homogeneous molten glass is removed from the bottom open end 40 of the chamber 35 and delivered to a trough 41 for intended usage.

Glass emanating from the refining unit 14, designated Stage 4 glass, is molten, refined, having a controlled number of gaseous inclusions, and homogenized.

The molten glass is processed continuously in one embodiment so that the rate of processing in each chamber is about continuously the same. In another embodiment the molten glass may be processed in each chamber, and then passed to a subsequent process step at intervals of time.

The simultaneous application of heat and agitation to glass-making materials in the first mix-melter quickly produces a glass having some undissolved sand grains and cords but having undesirable gaseous conclusions. The second mix-melter completes the homogenization of the glass, completely dissolving said grains and removing cords but having undesirable gaseous inclusions.

The rapid melting of glass-forming material into a homogeneous molten glass, permits a substantial reduction in the volumetric capacity of mix-melters when compared with the volume of conventional glass furnaces, producing the same output per day. The refiner rapidly removes entrapped gaseous inclusions from the homogeneous glass. The process produces a molten, homogeneous glass with a controlled number of gaseous inclusions.

This invention provides a compact apparatus which effectively produces refined, homogenized molten glass.

We claim:
1. A method of making glass which comprises applying heat to glass-forming materials to produce a mass of molten glass, mixing glass-forming materials in the molten glass, agitating the mixture of glass-forming materials and molten glass, and applying heat to said mixture, continuing the mixing, agitation and application of heat for a time such as to disperse the materials rapidly and uniformly in the mass of molten glass, facilitate transfer of heat to the materials and promote rapid chemical reactions until a molten glass is produced which has some undissolved glass-forming materials, cords, and incompleted chemical reactions between the glass-forming materials and contains gaseous inclusions, thereafter subjecting such molten glass having some undissolved glass-forming materials, cords, and incompleted chemical reactions and containing gaseous inclusions to a shearing action, continuing the shearing action until the undissolved glass-forming materials are substantially dissolved, undesirable cords are removed, and chemical reactions are substantially completed, leaving the molten glass in a homogenized state having gaseous inclusions therein, thereafter rotating the homogenized molten glass containing gaseous inclusions, continuing the rotation for a time and at a speed such as to produce pressure gradients within the glass to cause gaseous inclusions to migrate out of the glass and thereby produce a refined molten glass having a controlled number of gaseous inclusions.

2. The method set forth in claim 1 including the step of applying heat to said glass melt during said step of shearing.

3. The method set forth in claim 1 including the step of subjecting the glass to a temperature conditioning step between the step of shearing and the step of rotating.

4. The method of making glass which comprises heating glass-forming materials to produce a mass of molten glass, substantially continuously delivering glass-forming materials to said mass of molten glass, mixing said glass-forming materials in the molten glass, agitating the mixture of glass-forming materials and the molten glass and applying heat, continuing the mixing, agitating, and application of heat for a time such as to rapidly disperse the glass-forming materials in the molten glass and facilitate heat transfer to the materials and promote rapid chemical reactions to produce molten glass, which molten glass has some undissolved glass-forming materials, cords, and incompleted chemical reactions between the glass-forming materials and contains gaseous inclusions, continuously removing said molten glass having some undissolved glass-forming materials, cords, and incompleted chemical reactions and containing gaseous inclusions from said heated and agitated mass of glass, subjecting the molten glass removed from the mass being heated and agitated to a shearing action by moving the glass between relatively moving surfaces, and continuing the shearing action until molten glass is produced which has the glass-forming materials substantially dissolved, the undesirable cords removed, the chemical reactions substantially completed so that the molten glass is homogeneous and contains gaseous inclusions, continuously removing the homogeneous molten glass containing gaseous inclusions, continuously rotating such homogeneous molten glass containing gaseous inclusions, and continuing rotation for a time and at a speed to produce pressure gradients within the glass until the molten glass has a controlled number of gaseous inclusions, and thereafter continuously removing such refined molten glass with a controlled number of gaseous inclusions.

5. The method set forth in claim 4 including the step of applying heat to said glass melt during said step of shearing.

6. The method set forth in claim 4 including the step of subjecting the glass to a temperature conditioning step between the step of shearing and the step of rotating the molten glass.

7. The method of making glass which comprises heating glass-forming materials in a first chamber to produce a mass of molten glass, substantially continuously delivering glass-forming materials to said mass of molten glass in said first chamber, mixing said glass-forming materials in the molten glass, agitating the mixture of said glass-forming materials and molten glass, and applying heat, continuing the mixing agitation and application of heat for a time such as to rapidly disperse the glass-forming materials in the molten glass and facilitate heat transfer and promote rapid chemical reactions to produce molten glass, which molten glass has some undissolved glass-forming materials, cords, and incompleted chemical reactions between the glass-forming materials and contains gaseous inclusions, continuously removing said molten glass having some undissolved glass-forming materials, cords, and incompleted chemical reactions and containing gaseous inclusions from said first chamber, subjecting the molten glass removed from the mass being heated and agitated to a shearing action in a second chamber by moving the glass between relatively moving surfaces, and continuing the shearing action until molten glass is produced which has the glass-forming materials substantially dissolved, the undesirable cords removed, the chemical reactions substantially completed so that the molten glass is homogeneous and contains gaseous inclusions, continuously removing the homogeneous molten glass containing gaseous inclusions from said second chamber and delivering said glass to a third chamber, continuously rotating such molten glass containing gaseous inclusions in said third chamber, and continuing rotation for a time and at a speed to produce pressure gradients within the glass to cause the gaseous inclusions to migrate out of the glass until the molten glass has a controlled number of gaseous inclusions, and thereafter continuously removing such refined molten glass with a controlled number of gaseous inclusions from said third chamber.

8. The method set forth in claim 7 including the step of subjecting said glass in said second chamber to heat.

9. The method set forth in claim 7 including the step of subjecting said glass which is removed from said second chamber to a temperature conditioning step before it is introduced into said third chamber.

* * * * *

UNITED STATES PATENT OFFICE
CERTIFICATE OF CORRECTION

Patent No. 3,819,350        Dated June 25, 1974

Inventor(s) FRED G. PELLETT, RAYMOND S. RICHARDS, ROBERT R. ROUGH, DOUGLAS F. ST. JOHN and PAUL R. WENGERT It is certified that error appears in the above-identified patent and that said Letters Patent are hereby corrected as shown below:

Col. 4, line 53, delete "180,672" and insert therefor --130,672--. Col. 6, line 47, delete "but having undesirable gaseous conclusions" and insert therefor --and containing gaseous inclusions--; Col. 6, line 49, delete "said" and insert therefor --sand--.

Signed and sealed this 29th day of October 1974.

(SEAL)
Attest:

McCOY M. GIBSON JR.                C. MARSHALL DANN
Attesting Officer                  Commissioner of Patents